United States Patent [19]
Duncan

[11] Patent Number: 5,848,478
[45] Date of Patent: Dec. 15, 1998

[54] FAUCET TEMPLATE

[75] Inventor: Scott E. Duncan, Santa Rosa, Calif.

[73] Assignee: Advant/edge, LLC, Santa Rosa, Calif.

[21] Appl. No.: 782,197

[22] Filed: Jan. 10, 1997

[51] Int. Cl.⁶ .................................................. G01B 5/25
[52] U.S. Cl. .............................. 33/562; 33/412; 33/529; 269/904
[58] Field of Search ............................. 33/562, 412, 520, 33/529, 533, 613, 644, 645, 654, 563, 566; 7/163, 164; 269/904; 81/13, 55; 411/87, 91, 92

[56] References Cited

U.S. PATENT DOCUMENTS

| | | | |
|---|---|---|---|
| 2,314,950 | 3/1943 | Pope | 33/563 |
| 4,177,569 | 12/1979 | Greer | 33/562 |
| 5,390,422 | 2/1995 | Hill | 33/412 |
| 5,392,524 | 2/1995 | Hill | 33/412 |

*Primary Examiner*—Christopher W. Fulton
*Attorney, Agent, or Firm*—Malcolm B. Wittenberg

[57] ABSTRACT

A template for use in the installation of water faucets and spouts adjacent to a sink or tub upon a plywood support. The plywood, acting as a support for mortar and tile, is opened to the approximate dimension of the template upon which suitable valve and faucets stems are appended and fixedly attached.

11 Claims, 3 Drawing Sheets

FAUCET TEMPLATE

TECHNICAL FIELD OF THE INVENTION

The present invention deals with a device and method for using the device to assist in the installation of water faucets and spouts adjacent to sinks or tubs where mortar and a decorative top surface such as tile, granite, marble, brick, etc. are to be applied upon a plywood support. The use of the present invention greatly facilitates the application of suitable plumbing hardware over techniques taught by the prior art. Throughout this disclosure, reference will be made to the application of tile to a suitable substrate. However, the present invention is equally applicable to the application of any decorative material on a mortar base.

BACKGROUND OF THE INVENTION

Although tiled counter tops and tiled tub installations are understandably quite popular, the application of water faucets and spouts adjacent sinks or tubs onto a mortared surface presents unique challenges to modern day plumbing contractors.

Currently, a plywood support is constructed in the fabrication of a suitable sink bearing counter top or tub bearing ledge. Upon the fabrication of the suitable plywood structure, the plumbing contractor is generally called upon to drill holes in the plywood surface proximate or slightly larger than the diameter of the water faucet and spout stems which then receive the water faucets and spouts adjacent the sinks or tubs. A mortar base is then applied to the plywood surface and a top surface such as tile, granite, marble, brick, etc. is then laid upon the mortar. Water pipes are generally inserted through holes made in the plywood preventing the mortar from blocking the holes. After the tile has been applied, the plumber must return to install the faucets. However, if the mortar and tile have been applied too thickly, the faucet cannot be attached without cutting away the underside of the counter. Oftentimes, this results in damaging the tile and providing a faucet and spout installation which is uneven and somewhat unsightly.

In addition to the above, applying the plumbing hardware directly to the plywood is, even in the best of conditions, a difficult task. In a sink installation, the fabricated plywood structure generally is configured as a cabinet. The plumbing contractor must climb within the cabinet and use a basin wrench to apply the hold down nut and supply nut onto the stems which only slightly protrude within the holes drilled into the plywood surface. It is quite difficult to fit the hooked basin wrench about the hold down nut and supply nut as the plywood provides little room for maneuvering.

An attempt to solve these difficulties was provided by U.S. Pat. No. 4,177,569 issued on Dec. 11, 1979. The invention of the '569 patent consisted of a template having a base formed with a hole which was applied to an opening cut within a plywood surface adjacent another opening for receiving a sink. The prior art suggested the use of a cylinder aligned with a hole in the template such that when mortar and tile was applied to the plywood surface, the cylinder maintained a clear hole through the mortar and tile through which the faucet fits.

Although, seemingly, the invention of the '569 patent represented an advance in the application of suitable water faucet hardware to a plywood surface, the invention described in this patent has not been widely adopted by the trade. Although the prior art solves a number of the problems outlined above, it is still not an ideal solution for the application of the hold down nut and supply nut onto the faucet's stem using a basin wrench in conjunction with the template of the '569 patent remains a difficult task. Specifically, the template of the '569 patent having a planar surface which resides on top of its plywood support does not present a sufficient length of stem surface to the plumbing contractor to facilitate application of the hold down and supply nuts through the application of the above-noted basin wrench.

It is thus an object of the present invention to provide a suitable template to facilitate the installation of water faucets and spouts adjacent to sink or tub upon a plywood support upon which mortar and tile are to be applied which eliminates the deficiencies of the prior art as noted above.

These and further objects will be more readily appreciated when considering the following disclosure and appended drawings.

SUMMARY OF THE INVENTION

The present invention is directed to a template and method for using the template in the installation of water faucets and spouts adjacent a sink or tub. Typically, a plywood frame is constructed to support the sink or tub installation upon which mortar and tile are later applied.

The template comprises a border having a perimeter and a series of three plateau surfaces. Each plateau surface is provided with a geometrically centered hole configured therein. Each plateau surface is elevated above the border and each plateau surface is separated from an adjacent plateau surface by an open channel. The plateau surfaces can be separated from one another by cutting segments in the border between open channels and the perimeter of the template.

DETAILED DESCRIPTION OF THE INVENTION

Figure 1:
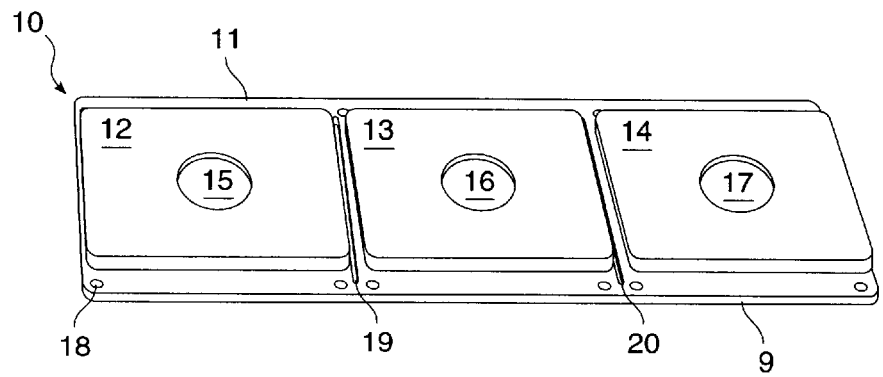
FIG. 1 is a top perspective view of the template of the present invention.

The template of the present invention which can be composed of any suitable plastic such as polypropylene or ABS is shown perspectively in FIG. 1. In this regard, template 10 is shown as comprising a border region 11 and a periphery 9 as well as a series of three plateau surfaces 12, 13 and 14. Geometrically centered holes 15, 16 and 17 are configured within the plateau surfaces which are approximately four inches from one another measured center to center. This spacing has been chosen as, typically, a widespread faucet used in a Roman tub is configured as having its water faucets separated eight inches measured center to center. By contrast, a typical bar sink faucet is provided with its water faucets separated four inches as measured center to center. As such, the template of the present invention is capable of accommodating most standard plumbing faucet installations without modification.

Again referring to FIG. 1, plateau surfaces 12, 13 and 14 are separated from one another on border 11 by open channels 19 and 20. Providing open channels facilitates the separation of plateau surfaces 12, 13 and 14 by enabling an end user to simply cut border 11 in regions between open channels 19 and 20 and perimeter 9. The ability to separate plateaus 12, 13 and 14 greatly enhance the universal appeal of the template of the present invention. For example, if template 10 was to be used in a bar sink faucet installation, only two plateaus would be necessary as the water faucets, as noted above, are separated a distance of only four inches center to center. In addition, the plateaus can be separated from one another and reconfigured radially to enable the faucet/spout installation to assume a non-linear configuration. Further, it is oftentimes preferred in, for example, a Roman tub installation to separate the faucets from the water spout. As such, a single plateau, removed from template 10 can be situated a distance from the water faucet installation to accommodate a stand-alone spout.

Figure 2A:
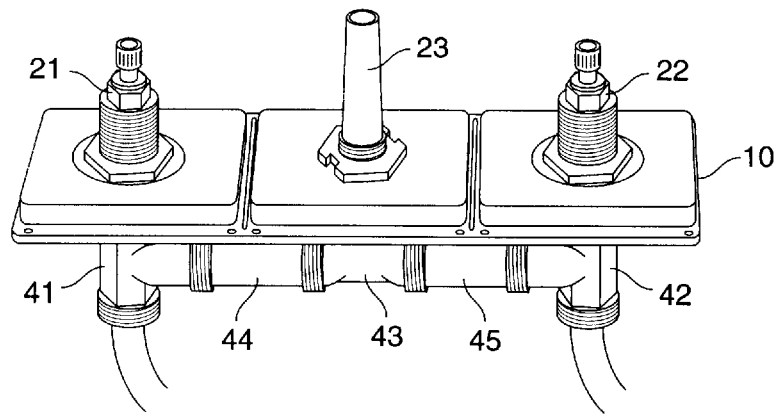
FIGS. 2a and 2b are top and bottom perspective views, respectively, of the present invention bearing suitable plumbing hardware.
Figure 2B:
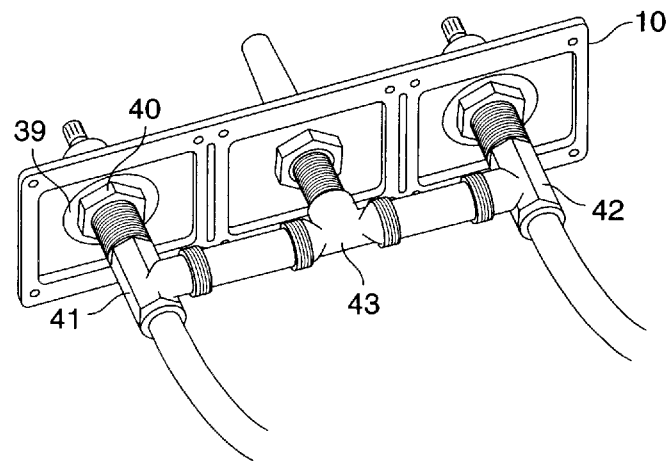

FIGS. 2a and 2b, collectively, depict the present invention with typical plumbing hardware installed thereon. In fact, in a Roman tub installation, it is common practice to install the plumbing hardware on the template of the present invention prior to its application to a suitable plywood support.

Figure 3:
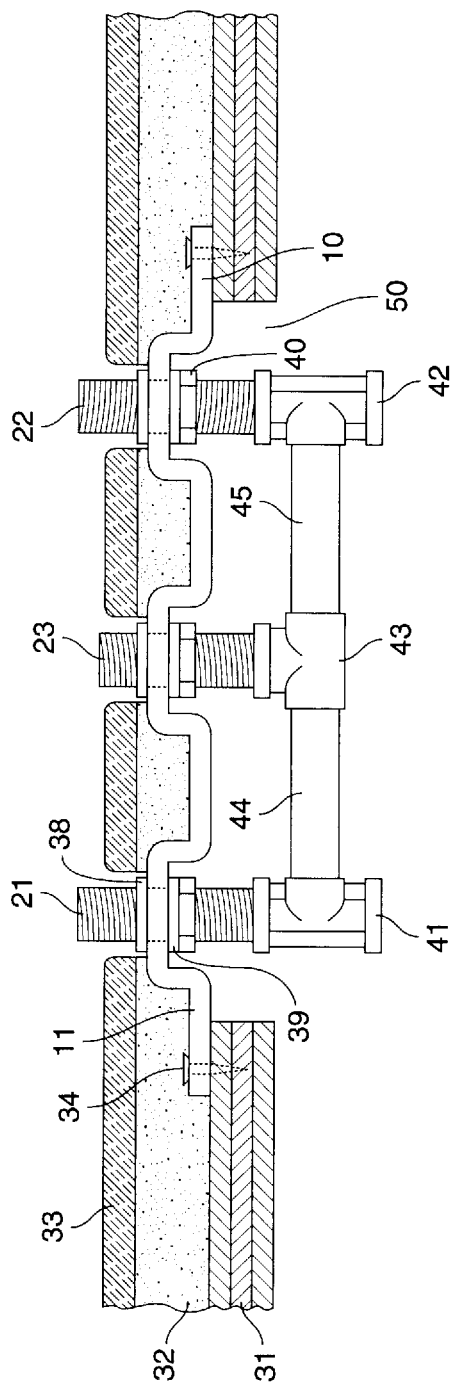
FIG. 3 is a side cross-sectional view of the present invention installed upon a suitable plywood support bearing plumbing fixtures.

Turning to FIGS. 2a and 2b, template 10 is shown as a support for stems 21 and 22 for suitable water faucets and stem 23 for a water mixing output spout. Stems 21, 22 and 23 are caused to pass through geometrically centered holes 15, 16 and 17 found within raised plateau surfaces 12, 13 and 14 (FIG. 1). The various stems are held in place via hold down nuts 38 and 39 (FIG. 3) as well as supply nuts 40 (FIG. 3). Typically, stems 21 and 22 connect water faucet hardware 41 and 42 in the form of t-joints for receiving hot and cold water, respectively, and feeding water to a mixing output spout via t-joint 43. As will be noted below in reference to the discussion of FIG. 3, it is the configuration of the present template whereby plateau surfaces 12, 13 and 14 are elevated above border region 11 that provides certain unique advantages in the present invention over all prior art known to applicant.

Turning to FIG. 3, plywood support 31 is shown having an opening 50 intended to be proximate to a sink or tub installation. The opening 50 of plywood support 31 can be established by inverting the template 10 and tracing the opening around the perimeter of plateaus 12, 13 and 14. Once opening 50 is cut, the appropriate hole sizing is established such that border 11 will remain in contact with plywood 31 enabling nails 34 to pass through holes 18 in border 11 to firmly attach template 10 to the plywood surface. If the plumbing hardware has not been previously applied to template 10 as shown in FIGS. 2a and 2b, application of stems 21, 22 and 23 can be applied to the installation by passing these stems through geometrically centered hole 15, 16 and 17 held in position by hold down nuts 38 and 39 as well as supply nuts 40.

It is noted in practicing the present invention that plateau surfaces 12, 13 and 14 which extend above border 11 greatly facilitate the practical usability of template 10. In providing the profile as shown in FIG. 3, the plumbing installer has more of stem 21, 22 and 23 extending below the template as a result of its raised plateau geometry and, as such, the plumbing installer will have more of the stems to work with in applying a basin wrench to the appropriate hold down and supply nuts. This is not a trivial consideration for, particularly as thick layers of mortar and tile are applied to the surface of plywood 31, the amount of stem which is available for receiving hold down and supply nuts can be greatly limited. The extra stem body provided by the profile of template 10 as shown in FIG. 3 wherein plateaus 12, 13 and 14 extend above border 11 can be quite significant.

Figure 4:
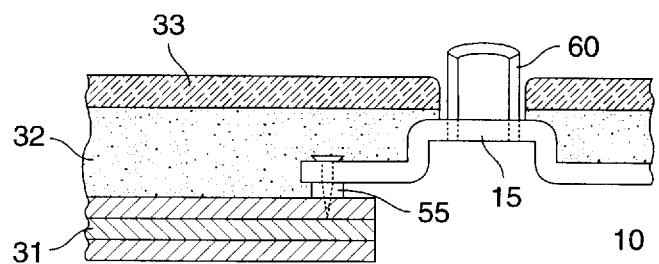
FIG. 4 is a partial cross-sectional view of the present invention bearing a cylinder as an optional expedient.

Once template 10 has been nailed to plywood 31, mortar 32 is applied which covers border region 11 and generally extends over at least a portion of plateaus 12, 13 and 14. As such, yet another advantage in providing elevated plateaus in template 10 is to minimize the amount of mortar which extends in the vicinity of geometrically centered holes 15, 16 and 17. As per the prior art, as one embodiment in practicing the present invention, when mortar 32 is anticipated as being particularly thick, cylinder 60 can be applied to the openings, for example, shown in FIG. 4 as being applied to opening 15. The purpose for cylinder 60 is the same as described in above referenced U.S. Pat. No. 4,177,569 enabling the tile setter to locate the opening and ensure that the opening is not obstructed by mortar 32 or by tile 33.

Figure 5:
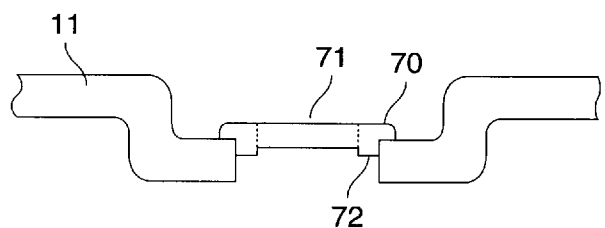
FIG. 5 is a partial cross-sectional view of the present invention depicting, as a preferred embodiment, a ring-shaped insert for modifying the diameter of the through hole of the template.

It is contemplated that openings 15, 16 and 17 be configured to have uniform diameters of one and five-sixteenth inches. These diameters will accommodate standard stems used in, for example, Roman tub faucet installations. However, when dealing with stems of larger diameter, plumbing contractors will find it to be a relatively simple task to cut out additional plateau material to enable the template of the present invention to accommodate such valve stems. In the event a smaller hole diameter is deemed appropriate, ring insert 70 (FIG. 5) can be placed within opening 15, 16 and 17 of template 11 by frictionally fitting ledge 72 in these openings thus reducing their size. Currently, as a preferred commercial embodiment, opening 71 of ring insert 70 is one and one-eighth inches in diameter.

To appreciate the significance of the geometry of applicant's template, it is noted that most faucet manufacturers specify a maximum deck height in the vicinity of the faucet installation to be approximately one and one-eighth to one and one-half inches. However, it is not uncommon to see an installation having three-quarters of an inch of plywood followed by a half inch of mortar and a quarter inch of tile. As such, the maximum specified deck height is exceeded and the plumbing installer needs the plateau regions extended above the template border in order to enable a suitable basin wrench to have enough stem surface to attach hold down and supply nuts. In certain extreme conditions, in order to correct for an uneven surface, a tile contractor may apply as much as two inches or more of mortar. In such an installation, it is contemplated that spacers 55 be installed between template 10 and plywood 31 to extend the height of template 10 with respect to the height of mortar 32. Alternatively, although not shown in any figure, in place of spacer 55 (FIG. 4), two or more templates can be stacked on top of one another in order to increase template elevation, again with respect to an overly thick layer of mortar 32.

I claim:

1. A template for use in the installation of water faucets and spouts having stems for attachment to said template adjacent to a sink or tub upon a plywood support upon which mortar and a decorative top surface are to be applied, said template comprising a border laving a perimeter and a series of plateau sections, providing for increased accessability to said stems below said template, each plateau section having geometrically centered holes configured therein and wherein each plateau section has a top and a bottom surface, both said top and bottom surface being elevated above said border forming a recess in said border and wherein each said plateau section is separated from an adjacent plateau section by an open channel in said border such that said plateau sections can be separated from one another by cutting segments of said border between said open channels and perimeter.

2. The template of claim 1 wherein said border is provided with holes for the nail attachment of said template to a plywood surface.

3. The template of claim 1 wherein said holes on said plateau surfaces are located four inches from one another, measured from the center points of each hole.

4. The template of claim 1 wherein said holes are each approximately one and five-sixteenth inches in diameter.

5. The template of claim 1 wherein a ring insert is provided with a ledge for frictionally fitting within at least one of said geometrically centered holes.

6. A method of applying water faucets and a water spout said faucets and water spout having stems for attachment to a template to a plywood surface to be mortared and a decorative top surface placed adjacent the sink or tub, said method comprising providing said template, said template comprising a border having a perimeter and a series of plateau sections, providing for increased accessability to said stems below said template, each plateau section having geometrically centered holes configured therein and wherein each plateau section has a top and a bottom surface, both said top and bottom surface being elevated above said border forming a recess in said border and wherein each said plateau section is separated from an adjacent plateau section by an open channel in said border such that said plateau sections can he separated from one another by cutting segments of said border between said open channels and perimeter, said method further comprising scrolling a line on said plywood adjacent the location of said sink or tub, using as a guide, the plateau sections of said template, cutting a hole in said plywood, attaching said template onto said plywood by passing nails through said border and into said plywood, applying mortar to said plywood to a thickness at least over said border of said template, passing stems of said water faucets and water spout through said geometrically centered holes, and applying nuts to said stems to maintain the stems fixedly on said template.

7. The method of claim 6 wherein said mortar is applied to said plywood at a thickness covering at least a portion of said plateau surfaces.

8. The method of claim 6 wherein said stems are fixedly attached to said template prior to attaching said template onto said plywood.

9. The method of claim 6 wherein at least one cylinder is aligned with at least one of said geometrically centered holes prior to application of said mortar to said plywood.

10. The method of claim 9 wherein said at least one cylinder is removed from said at least one geometrically centered hole subsequent to the application of mortar to said plywood.

11. The method of claim 6 wherein at least one spacer is inserted between said border and said plywood prior to passing said nails through said border and into said plywood.

\* \* \* \* \*